(12) United States Patent
Baskis

(10) Patent No.: US 10,787,380 B1
(45) Date of Patent: Sep. 29, 2020

(54) BIOSOLIDS CONCENTRATOR AND DIGESTER SYSTEM AND METHOD

(71) Applicant: Paul Baskis, Oakland, KY (US)

(72) Inventor: Paul Baskis, Oakland, KY (US)

( * ) Notice: Subject to any disclaimer, the term of this patent is extended or adjusted under 35 U.S.C. 154(b) by 0 days.

(21) Appl. No.: 16/248,754

(22) Filed: Jan. 15, 2019

(51) Int. Cl.
| | |
|---|---|
| *C02F 9/00* | (2006.01) |
| *C02F 3/30* | (2006.01) |
| *C02F 11/04* | (2006.01) |
| *C02F 1/44* | (2006.01) |
| *C02F 1/76* | (2006.01) |
| *C02F 1/66* | (2006.01) |
| *C02F 1/00* | (2006.01) |

(52) U.S. Cl.
CPC ............... *C02F 9/00* (2013.01); *C02F 1/44* (2013.01); *C02F 1/66* (2013.01); *C02F 1/76* (2013.01); *C02F 3/30* (2013.01); *C02F 11/04* (2013.01); *C02F 2001/007* (2013.01)

(58) Field of Classification Search
CPC ....... B09C 1/10; B09C 1/002; B09C 2101/00; B09C 1/08; C02F 3/341; C02F 3/348; C02F 2209/36; C02F 2101/366; C02F 2101/34; C02F 2103/06
USPC ............. 210/605, 609, 631, 252, 259, 198.1
See application file for complete search history.

(56) References Cited

U.S. PATENT DOCUMENTS

| | | | |
|---|---|---|---|
| 2005/0145569 A1* | 7/2005 | Ulmert ............. | B01D 61/16 210/639 |
| 2006/0043018 A1* | 3/2006 | Juby .................. | B01D 61/142 210/631 |
| 2007/0199894 A1* | 8/2007 | Peyton ............... | C02F 3/28 210/603 |
| 2013/0062289 A1* | 3/2013 | Cote .................. | B01D 61/022 210/723 |
| 2016/0002083 A1* | 1/2016 | Cote .................. | C02F 1/444 210/621 |
| 2016/0122218 A1* | 5/2016 | Trouve ............... | C02F 3/28 423/306 |
| 2017/0088449 A1* | 3/2017 | Cote .................. | B01D 61/18 |

* cited by examiner

*Primary Examiner* — Fred Prince
(74) *Attorney, Agent, or Firm* — Stoyanov Law PLLC; Roy L. Chan

(57) ABSTRACT

Methods and systems of a biosolids concentrator and digester system having an inlet, a digester, a digester-first clarifier connector, a first clarifier, a first clarifier-micron filter connector, a micron filter, a micron filter-membrane filter connector, a membrane filter, and an outlet. The inlet receives a waste stream. The inlet is in fluid communication with the digester. The digester is in fluid communication with the first clarifier through the digester-first clarifier connector. The first clarifier is in fluid communication with the micron filter through the first clarifier-micron filter connector. The micron filter is in fluid communication with the membrane filter through the micron filter-membrane filter connector. The membrane filter is in fluid communication with the outlet.

14 Claims, 2 Drawing Sheets

BIOSOLIDS CONCENTRATOR AND DIGESTER SYSTEM AND METHOD

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates to biosolids concentrator and digester systems and methods.

BRIEF SUMMARY OF THE INVENTION

In an embodiment of the present invention, a biosolids concentrator and digester system comprises an inlet, a digester, a digester-first clarifier connector, a first clarifier, a first clarifier-micron filter connector, a micron filter, a micron filter-membrane filter connector, a membrane filter, and an outlet. The inlet receives a waste stream. The inlet is in fluid communication with the digester. The digester is in fluid communication with the first clarifier through the digester-first clarifier connector. The first clarifier is in fluid communication with the micron filter through the first clarifier-micron filter connector. The micron filter is in fluid communication with the membrane filter through the micron filter-membrane filter connector. The membrane filter is in fluid communication with the outlet.

In another embodiment of the present invention, the biosolids concentrator and digester system further comprises a first clarifier-first manifold connector, a micron filter-first manifold connector, a membrane filter-first manifold connector, a first manifold, a first manifold-sludge digester set connector, a sludge digester set, a sludge digester set-second clarifier connector, a second clarifier, and a second clarifier-first clarifier connector. The first clarifier is in fluid communication with the first manifold through the first clarifier-first manifold connector. The micron filter is in fluid communication with the first manifold through the micron filter-first manifold connector. The membrane filter is in fluid communication with the first manifold through the membrane filter-first manifold connector. The first manifold is in fluid communication with the sludge digester set through the first manifold-sludge digester set connector. The sludge digester set is in fluid communication with the second clarifier through the sludge digester set-second clarifier connector. The second clarifier is in fluid communication with the first clarifier through the second clarifier-first clarifier connector.

In yet another embodiment of the present invention, the biosolids concentrator and digester system further comprises a second clarifier-mineral sludge tank connector and a mineral sludge tank. The second clarifier is in fluid communication with the mineral sludge tank through the second clarifier-mineral sludge tank connector.

In another embodiment of the present invention, a component is thermally treated. The component is selected from the group consisting of the inlet, the digester, the first manifold, the first manifold-sludge digester set connector, the sludge digester set, and combinations thereof.

In yet another embodiment of the present invention, the biosolids concentrator and digester system further comprises a membrane filter-pH adjustment/chlorination tank connector and a pH adjustment/chlorination tank. The membrane filter is in fluid communication with the pH adjustment/chlorination tank through the membrane filter-pH adjustment/chlorination tank connector. The pH adjustment/chlorination tank is in fluid communication with the outlet.

In another embodiment of the present invention, the biosolids concentrator and digester system further comprises a first clarifier-first manifold connector, a micron filter-first manifold connector, a membrane filter-first manifold connector, a first manifold, a first manifold-sludge digester set connector, a sludge digester set, a sludge digester set-second clarifier connector, a second clarifier, and a second clarifier-first clarifier connector. The first clarifier is in fluid communication with the first manifold through the first clarifier-first manifold connector. The micron filter is in fluid communication with the first manifold through the micron filter-first manifold connector. The membrane filter is in fluid communication with the first manifold through the membrane filter-first manifold connector. The first manifold is in fluid communication with the sludge digester set through the first manifold-sludge digester set connector. The sludge digester set is in fluid communication with the second clarifier through the sludge digester set-second clarifier connector. The second clarifier is in fluid communication with the first clarifier through the second clarifier-first clarifier connector.

In yet another embodiment of the present invention, the biosolids concentrator and digester system further comprises a second clarifier-mineral sludge tank connector and a mineral sludge tank. The second clarifier is in fluid communication with the mineral sludge tank through the second clarifier-mineral sludge tank connector.

In another embodiment of the present invention, a component is thermally treated. The component is selected from the group consisting of the inlet, the digester, the first manifold, the first manifold-sludge digester set connector, the sludge digester set, and combinations thereof.

In yet another embodiment of the present invention, a biosolids concentrator and digester system comprises an inlet, an equalization/separation tank, an equalization/separation tank-anaerobic tank connector, an anaerobic tank, an anaerobic tank-aerobic tank connector, an aerobic tank, an aerobic tank-clarifier tank connector, and a clarifier tank. The inlet receives a waste stream. The inlet is in fluid communication with the equalization/separation tank. The equalization/separation tank comprises an equalization/separation tank top portion, an equalization/separation tank bottom portion, and a first aeration tube. The anaerobic tank comprises an anaerobic tank top portion and an anaerobic tank bottom portion. The aerobic tank comprises an aerobic tank top portion, an aerobic tank bottom portion, and a second aeration tube. The equalization/separation tank is in fluid communication with the anaerobic tank through the equalization/separation tank-anaerobic tank connector. The waste stream enters the equalization/separation tank through the inlet at the equalization/separation tank bottom portion. The waste stream leaves the equalization/separation tank through the equalization/separation tank-anaerobic tank connector at the equalization/separation tank top portion. The anaerobic tank is in fluid communication with the aerobic tank through the anaerobic tank-aerobic tank connector. The waste stream enters the anaerobic tank through the equalization/separation tank-anaerobic tank connector at the anaerobic tank bottom portion. The waste stream leaves the anaerobic tank through the anaerobic tank-aerobic tank connector at the anaerobic top portion. The aerobic tank is in fluid communication with the clarifier tank through the aerobic tank-clarifier tank connector. The waste stream enters the aerobic tank through the anaerobic tank-aerobic tank connector at the aerobic tank bottom portion. The waste stream leaves the aerobic tank through the aerobic tank-clarifier tank connector at the anaerobic top portion.

In another embodiment of the present invention, the biosolids concentrator and digester system further comprises an equalization/separation tank-second manifold connector, an anaerobic tank-second manifold connector, an aerobic tank-second manifold connector, a clarifier tank-second manifold connector, a second manifold, and a second manifold outlet. The equalization/separation tank is in fluid communication with the second manifold through the equalization/separation tank-second manifold connector. The anaerobic tank is in fluid communication with the second manifold through the anaerobic tank-second manifold connector. The aerobic tank is in fluid communication with the second manifold through the aerobic tank-second manifold connector. The clarifier tank is in fluid communication with the second manifold through the clarifier tank-second manifold connector. The second manifold is in fluid communication with the second manifold outlet.

In yet another embodiment of the present invention, a component is thermally treated. The component is selected from the group consisting of the inlet, the equalization/separation tank, the equalization/separation tank-anaerobic tank connector, the anaerobic tank, the anaerobic tank-aerobic tank connector, the aerobic tank, and combinations thereof.

In another embodiment of the present invention, a method of concentrating and digesting biosolids comprises processing a waste stream through a biosolids concentrator and digester system and establishing fluid communications between the inlet, the digester, the first clarifier, the micron filter, and the membrane filter. The biosolids concentrator and digester system comprises a digester, a first clarifier, a micron filter, and a membrane filter.

In yet another embodiment of the present invention, the biosolids concentrator and digester system further comprises a pH adjustment/chlorination tank. The method of concentrating and digesting biosolids further comprises establishing fluid communication between the membrane filter and the pH adjustment/chlorination tank.

In another embodiment of the present invention, the biosolids concentrator and digester system further comprises a first manifold, a sludge digester set, and a second clarifier. The method of concentrating and digesting biosolids further comprises establishing fluid communication between the first manifold, the micron filter, the membrane filter, the sludge digester set, the second clarifier, and the first clarifier.

In yet another embodiment of the present invention, the biosolids concentrator and digester system further comprises a mineral sludge tank. The method of concentrating and digesting biosolids further comprises establishing fluid communication between the second clarifier and the mineral sludge tank.

In another embodiment of the present invention, the method of concentrating and digesting biosolids further comprises thermally treating a component. The component is selected from the group consisting of the digester, the first manifold, the sludge digester set, and combinations thereof.

In yet another embodiment of the present invention, a method of concentrating and digesting biosolids comprises processing a waste stream through a biosolids concentrator and digester system and establishing fluid communications between the equalization/separation tank, the anaerobic tank, the aerobic tank, and the clarifier tank. The biosolids concentrator and digester system comprises an equalization/separation tank, an anaerobic tank, an aerobic tank, and a clarifier tank.

In another embodiment of the present invention, the biosolids concentrator and digester system further comprises a second manifold and a second manifold outlet. The method of concentrating and digesting biosolids further comprises establishing fluid communication between the equalization/separation tank, the second manifold, the anaerobic tank, the aerobic tank, the clarifier tank and the second manifold outlet.

In yet another embodiment of the present invention, the method of concentrating and digesting biosolids further comprises thermally treating a component. The component is selected from the group consisting of the equalization/separation tank, the anaerobic tank, the aerobic tank, and combinations thereof.

BRIEF DESCRIPTION OF THE SEVERAL VIEWS OF THE DRAWING

The advantages and features of the present invention will be better understood as the following description is read in conjunction with the accompanying drawings, wherein.

Figure 1:
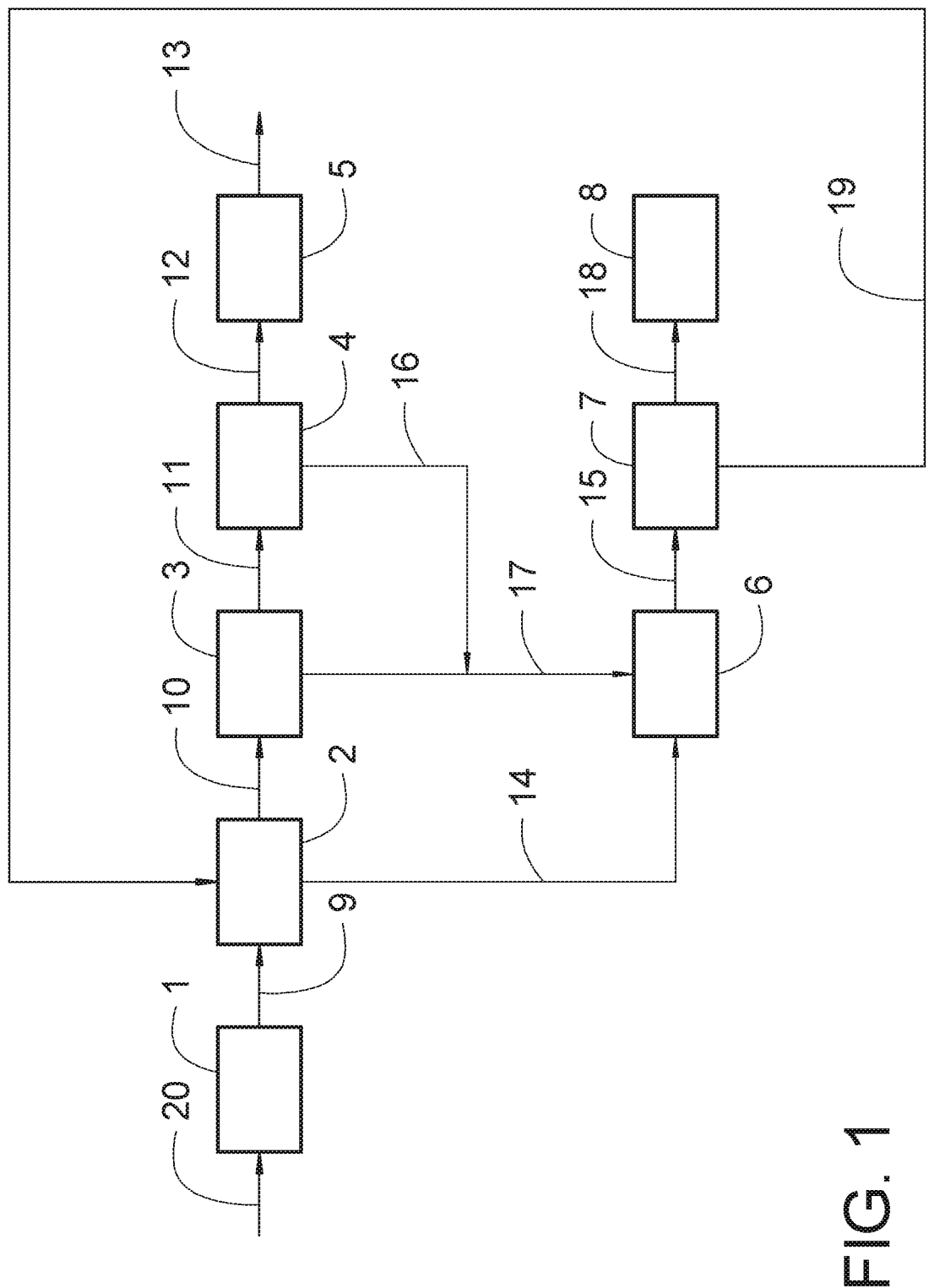
FIG. 1 is a diagram of an embodiment of the present invention

For clarity purposes, all reference numerals may not be included in every figure.

DETAILED DESCRIPTION OF THE INVENTION

The present invention can provide for the elimination of nearly 90% of the water in the waste stream and allows for a compact digester system for handling low Biochemical Oxygen Demand (BOD) concentration waste streams. A process and apparatus for treatment are disclosed. A Bio-Solids Concentrator and Digester System (BCDS) according to the present invention, uses tanks that are more compact than common trickle filter to digest simple compounds in the waste stream rapidly. A Bio-Solids Concentrator and Digester System (BCDS) according to the present invention uses air stratification to separate compounds with higher density from compounds with lower density; and also uses clarification, micron filtration and membrane filtration to clean the waste stream water to near drinking water quality for discharge. This eliminates all of the excess water so that the system for digesting the waste can be smaller than a common trickle filter, for example one quarter the size of a common trickle filter. The bottom of the clarifier and the back flush from both the micron filter system and the membrane filter system can be sent to a second digester additional reduction in BOD (e.g., 85-90% reduction of BOD) providing for a substantial reduction in sludge production.

The present invention can be regulated for adaptable operation and is reliable. Operation could be maximum reduction of the waste stream or could be utilized to provide for high volumes of methane production. The microbial environment is determined by the makeup of the waste stream and the environment in the digesters as the microbial ecology will adjust to the substrates that are available for use as food. This system mimics natural environmental systems found in aqueous environments.

Tanks may preferably be insulated or enclosed in a climate controlled building to provide for a stable temperature regime especially if anaerobic digestion is preferred. A stable temperature encourages a stable microbial environment and will produce the best results for consuming the waste stream. As the microbial community grows and develops it may eventually become too large for the tanks and may require a mechanical sloughing to remove excess microbial biomass and encourage rapid growth of new biomass. Mechanical sloughing is preferred as it is controllable and allows for pruning of the microbial community when it is most advantageous for consuming the waste stream.

The back-flush of the micron filter and the membrane filter that contain residuals of the microbial biomass is directed into a sludge digester that also receives periodically mechanically sloughed microbial biomass (e.g., from the digesters) that are separated from the waste stream in the first clarifier. Mechanically sloughing the microbial biomass allows for the control of the infiltration rate of the bio filters in the digesters and also encourages the rapid growth phase of the microbial biomass that encourages the uptake of the simpler compounds in the waste stream.

By eliminating excess water from the waste stream and by concentrating the bio-solids for digestion, a system according to this invention provides for maximum digestion of the bio-solids in a much smaller system than that of a common system using for example trickle filters By way of example a 40,000 gal/day (gallons per day) system at 300 mg/L (milligrams per liter) BOD has only 150 lbs/d (pounds per day) of actual biologically degradable solids. A system according to this invention to digest this 150 lbs/day of bio-degradable solids can comprise four 6,000 gallon tanks or 24,000 gal/day total volume as compared to 160,000 gal/d total volume for a common trickle filter.

The process according to an embodiment of this invention is a biological process utilizing a series of bio filters to eliminate biodegradable compounds in waste streams and provide for the production of a concentrated sludge that can be settled easily in a clarifier, prior to mechanical separation and filtration of the waste stream. Such steps allow for the elimination of the majority of the waste water and guarantee the quality of the discharge while retaining the biodegradable organic compounds for complete degradation in a sludge digester. The elimination of the excess waste water eliminates the necessity to use extremely large size bio filters required to handle the entire waste water stream as is done in a common trickle filter system.

FIG. 1 shows an embodiment of the present invention that is capable of taking low Biochemical Oxygen Demand (BOD) waste streams that have mostly soluble compounds that are not easily separated but are easily digested and convert the low BOD waste streams into microbial biomass that can be easily separated in a common clarification system.

For example, as illustrated in FIG. 1, low BOD waste stream (e.g., BOD of 300 mg/L or less) containing soluble compounds that are not easily separated from the waste stream water enters a first digester set 1 through inlet pipe 20. The first digester set 1 may comprise one or more bio-filters that digest (e.g., break down) biodegradable materials using microorganisms. The soluble compounds in the waste stream are digested in the first digester set 1 and converted to microbial biomass which is heavier than the waste stream water. A portion of the microbial biomass will settle in the first digester set 1 while another portion of the microbial biomass will flow with the waste stream through connector pipe 9 from the first digester set 1 into the first clarifier 2. In the first clarifier 2 the microbial biomass derived in the first digester set 1 from the soluble compounds can now readily be separated, for example by sedimentation, and removed from the waste stream. From the first clarifier 2 the waste stream, now with the microbial biomass removed, is transferred through pipe connector 10 into the micron filter 3 where the waste stream water is further removed of BOD by removing organic particles with sizes larger than the rating of the micron filter 3. The micron filter 3 may comprise one or more micron screens arranged in series, each with filter openings, for example in the range of 0.22 to 5 microns, or even smaller in some situations. The filtered waste stream water exits the micron filter 3 through pipe connector 11 and enters the membrane filter 4 where the BOD is still further reduced by filtering particles larger than the rating of the membrane filter 4. The membrane filter 4 may comprise one or more semi-permeable membranes capable of filtering particles smaller than the particles filtered by the micron filter 3, for example in the range of 0.001-1 micron. The waste stream water filtered through the membrane filter 4 has very low BOD (for example, in the range of 5 to 10 mg/L; this range however, could vary substantially depending on the content of the waste stream) and exits the membrane filter 4 through pipe 12 from where it may be transported to a pH adjustment/chlorination tank 5 and then is discharged as near drinking water quality through outlet pipe 13. In this embodiment pH adjustment/chlorination tank 5 may be a pH adjustment tank, a chlorination tank, or a combination of a pH adjustment tank and a chlorination tank. In the alternative the waste stream water exiting the membrane filter 4 through pipe 12 may be discharged in the environment (not shown) without passing through the pH-adjustment/chlorination tank 5.

The portion of the microbial biomass that settles in the first digester set 1, as described above, may be periodically mechanically sloughed so that it can flow with the waste water stream water through pipe 9 into the first clarifier 2 for separation. The period of mechanical sloughing can be determined by the rate at which the microbial biomass settles in the first digester set 1, and can range for example from under 20 minutes to 2 days, or even more in some circumstances.

The solids separated from the waste stream in the first clarifier 2, can be directed to the sludge digester set (6) through pipe connector 14. The back flush from the micron filter 3 is directed to the sludge digester set 6 through pipe connector 17, and the back flush from the membrane filter 4 is directed to the sludge digester set 6 through pipe connector 16. The sludge digester set 6 may comprise one or more bio-filters that can be arranged in series to microbiologically degrade the organic component of the sludge into carbon dioxide and water ("sludge water"). With embodiments of this invention it is possible to microbiologically degrade 80%-90% and even more, of the sludge and convert it into carbon dioxide and sludge water. The sludge water exits the sludge digester set 6 through pipe connector 15 and enters the second clarifier 7 where any remaining mineral solids are settled and separated from the water resulting in clean sludge water. The clean sludge water from the second clarifier 7 leaves through pipe connector 19 and is directed back into the first clarifier 2 and subsequently through pipe connector 10 to the micron filter 3, and through pipe connector 11 to the membrane filter 4, from where it may be transported through pipe 12 to the pH adjustment/chlorination tank 5, and subsequently discharged through outlet pipe 13 as near drinking water quality. In the alternative the pipe connecter 12 may not feed into a pH adjustment/chlorination tank 5, and instead discharge into the environment or another container (not shown).

The solids separated from the sludge water in the second clarifier 7 leave through the through pipe connector 18 and are transferred to the mineral sludge tank 8 for disposal.

Figure 2:
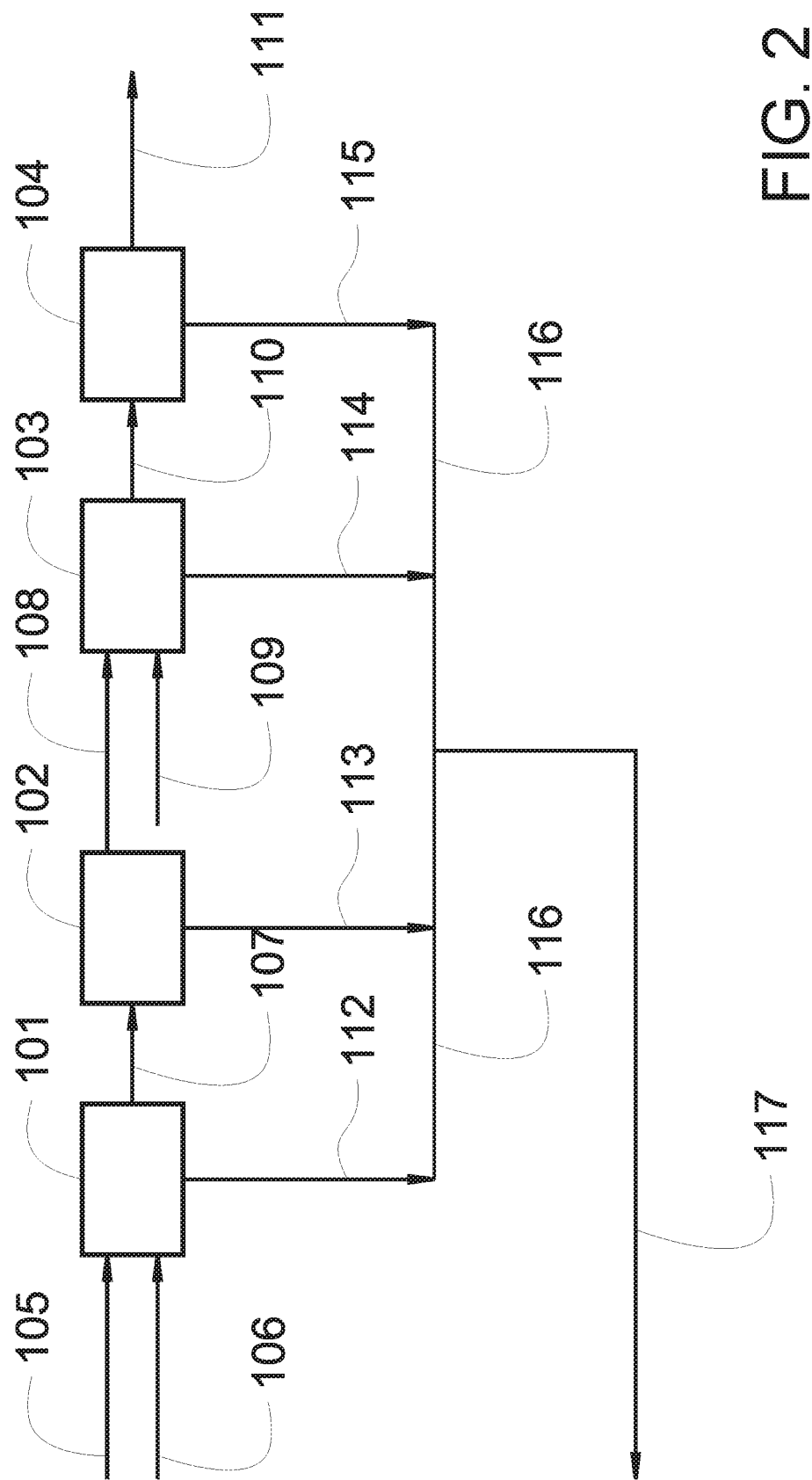
FIG. 2 is a diagram of another embodiment of the present invention

FIG. 2 illustrates another embodiment of the present invention capable of handling waste streams with high levels of BOD, reaching as high as BOD of 20,000, or more, which may be generated as industrial waste, for example in the food and beverage Industry. For example, liquid waste containing sludge is transported as a waste stream through input pipe 105 into the equalization/separation tank 101 through the input pipe 105. In the equalization/separation tank 101 the heavy components of the waste stream, such as sand, silt, clay, and/or others, are separated from the medium and light components, for example organic components with lower density. For convenience in this description we use the term "heavy" to refer to waste stream components with, for example, 2.65 or higher Specific Gravity relative to Water (SG measured in grams per cubic centimeter (g/cm3 or g/cc)) and the term "light" to refer to waste stream components with less than 1.4 SG. Waste stream components between 1.4 SG and 2.65 SG will, for convenience be referred to as "medium." The equalization/separation tank 101 also may equalize the downstream flow, thereby reducing fluctuation and facilitating the light and medium waste stream components' flow to the subsequent tanks. It will be understood that the "heavy," "medium" and "light" ranges provided for this embodiment are solely examples and are non-limiting. Any separation of waste stream components resulting from the components' different specific gravities or densities will satisfy this invention.

Input pipe 105 may direct the waste stream towards the bottom of the equalization/separation tank 101. Air maybe introduced near the bottom of equalization/separation tank 101 at a rate selected by an operator through aerator 106. The air flows from aerator 106 into the equalization/separation tank 101 and travels upwards taking with it the light and medium particulate components of the waste stream that is being directed downward by input pipe 105. In some embodiments input pipe 105 may release the waste stream near the bottom of the equalization/separation tank 101 instead of just directing it downward. Such a configuration in which both the waste stream and the air are introduced near the bottom of equalization/separation tank 101 is beneficial for very high BOD waste streams as it may prevent or reduce the air and/or oxygen depletion in the equalization/separation tank 101. Oxygen and/or air depletion may result when high BOD waste stream is fed near the top of the equalization/separation tank 101 and air is introduced near the bottom and the oxygen is depleted as air travels upwards. When the air reaches the waste stream with highest BOD it may be depleted of oxygen, which in turn may cause the aerobic microbial community in the equalization/separation tank 101 to collapse. In this embodiment of the invention, introducing both the air and the high BOD waste stream at or near the bottom of the equalization/separation tank 101 ensures that the maximum oxygen content of the air coincides with the maximum BOD of the waste stream reducing the risk of oxygen depletion.

As the waste stream components are separated based on the components' varying specific gravity or density the heavy components stay closer to, and accumulate near the bottom of the equalization/separation tank 101 and the light components are taken up with the rising air. The organic heavy components of the waste stream that collect near the bottom of the equalization/separation tank 101 degrade through aerobic and/or anaerobic microbial activity into light and medium components, which are eventually raised upwards with the air through the equalization/separation tank 101. As the light and medium components are directed toward the top of the equalization/separation tank 101 they eventually exit the equalization/separation tank 101 together with the waste stream through connector pipe 107. Connector pipe 107 may direct the waste stream carrying the light and medium components downward into the anaerobic tank 102, or pipe 107 may extend downward into anaerobic tank 102 and releases the waste stream carrying the light and medium components near the bottom of the anaerobic tank 102. In the anaerobic tank 102 anaerobic bacteria degrades, or converts the organic components of the waste stream into simple sugars, fatty acids and other simple compounds, which travel upwards through the anaerobic tank 102. As the simple sugars, fatty acids, other simple compounds reach the top of the anaerobic tank 102 they exit through connector pipe 108 and travel to the aerobic digester 103 where they may enter at the bottom of the aerobic digester 103 and travel upwards. Anaerobically digesting the waste stream compounds in the anaerobic tank 102 prior to the aerobic digester 103 facilitates the larger complex compounds' break down to the simple compounds (e.g., simple sugars, fatty acids and other simple compounds) without air which are then transferred into the aerobic digester 103 where they are easier to digest than the original larger complex compounds, such as cellulose, and others.

Air maybe introduced near the bottom of the aerobic digester 103 at a rate selected by an operator through aerator 109. The air flows from aerator 109 and travels upwards taking up with it the fatty acids and simple sugars. As the simple sugars and fatty acids move up through the aerobic digester 103 they are digested into carbon dioxide and water and exit the aerobic digester 103 through pipe 110 and enter the clarifier tank 104, from where they are discharged through pipe 111.

Mineral components of the waste stream tend to settle at the bottom of the tanks 101, 102, 103, 104. These mineral components can be removed through pipes 112, 113, 114, 115 and exit through manifold 116 to the discharge pipe 117.

The Bio-solids Concentrator and Digester System provides a system and process where a waste stream is passed through a series of fixed film anaerobic or aerobic digesters where larger solids become trapped in the fixed film membrane along with the ecological components of the microbial community. This configuration provides for the utilization and uptake of simple organic compounds in the waste stream that otherwise will be difficult or impossible to be separated from the waste stream and their associated conversion into microbial biomass. This microbial biomass is heavier than the waste stream with dissolved simple organic compounds and therefore settles much more rapidly than does the simpler organic compounds that make up most of the dissolved solids present in the original waste stream. The output of the digesters is transferred to a clarifier where these heavier microbial biomass are settled out, and the clarified waste stream is then transferred from a clarifier to a sequence of one or more filters, including micron filters and membrane filters. The waste stream clarified from the filters is discharged from the membrane filter to the environment at near drinking water quality.

An embodiment of a system according to this invention can also utilize a thermal treatment of the microbial biomass to break it down into simpler compounds for more rapid digestion in either an aerobic or an anaerobic digester. Thermal treatment, for example through heating, may be applied to any of the tanks where aerobic or anaerobic degradation occurs, preferably to one or more of the first digester set 1, sludge digester 6, equalization/separation tank 101, anaerobic tank 102, aerobic digester 103, or to one or more of the connectors feeding those tanks or digesters, for example inlet pipe 20, pipe connectors 14, 16, 17, input pipe 105, connector pipes 107, 108.

A process according to this invention does not require a particular start up method other than to begin the flow of the waste stream into the bio filters, which starts the growth of microbes that are most suited to digest the introduced waste stream. Running the tanks at a high BOD level with respect to the membrane media provides for rapid growth and development of the microbial biomass. There are no requirements to raise or lower the BOD levels of the bio filters as this provides no advantage to the growth of the microbial biomass. If the microbial biomass needs to be reduced to increase infiltration rates in the bio filters, it can be done mechanically either at timed intervals or by measuring the amount of pore space available in the bio filter. This is done by comparison of the amount of pore space in the bio filter with membrane installed prior to any microbial biomass growth, as determined by measuring the amount of water to fill the reactor and comparison with the amount of water when bio filter is full of microbial biomass.

While the invention has been described with reference to exemplary embodiments, it will be understood by those skilled in the art that various changes, omissions, and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiments disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

I claim:

1. A biosolids concentrator and digester system comprising:
    an inlet;
    a digester;
    a digester-first clarifier connector;
    a first clarifier;
    a first clarifier-micron filter connector;
    a micron filter;
    a micron filter-membrane filter connector;
    a membrane filter; and,
    an outlet;
    wherein the inlet receives a waste stream;
    wherein the inlet is in fluid communication with the digester;
    wherein the digester is in fluid communication with the first clarifier through the digester-first clarifier connector;
    wherein the first clarifier is in fluid communication with the micron filter through the first clarifier-micron filter connector;
    wherein the micron filter is in fluid communication with the membrane filter through the micron filter-membrane filter connector; and,
    wherein the membrane filter is in fluid communication with the outlet.

2. The biosolids concentrator and digester system of claim 1 further comprising:
    a first clarifier-first manifold connector;
    a micron filter-first manifold connector;
    a membrane filter-first manifold connector;
    a first manifold;
    a first manifold-sludge digester set connector;
    a sludge digester set;
    a sludge digester set-second clarifier connector;
    a second clarifier; and,
    a second clarifier-first clarifier connector;
    wherein the first clarifier is in fluid communication with the first manifold through the first clarifier-first manifold connector;
    wherein the micron filter is in fluid communication with the first manifold through the micron filter-first manifold connector;
    wherein the membrane filter is in fluid communication with the first manifold through the membrane filter-first manifold connector;
    wherein the first manifold is in fluid communication with the sludge digester set through the first manifold-sludge digester set connector;
    wherein the sludge digester set is in fluid communication with the second clarifier through the sludge digester set-second clarifier connector; and,
    wherein the second clarifier is in fluid communication with the first clarifier through the second clarifier-first clarifier connector.

3. The biosolids concentrator and digester system of claim 2 further comprising:
    a second clarifier-mineral sludge tank connector; and,
    a mineral sludge tank;
    wherein the second clarifier is in fluid communication with the mineral sludge tank through the second clarifier-mineral sludge tank connector.

4. The biosolids concentrator and digester system of claim 3, wherein a component is thermally treated; and,
    wherein the component is selected from the group consisting of the inlet, the digester, the first manifold, the first manifold-sludge digester set connector, the sludge digester set, and combinations thereof.

5. The biosolids concentrator and digester system of claim 1 further comprising:
    a membrane filter-pH adjustment/chlorination tank connector; and,
    a pH adjustment/chlorination tank;
    wherein the membrane filter is in fluid communication with the pH adjustment/chlorination tank through the membrane filter-pH adjustment/chlorination tank connector; and,
    wherein the pH adjustment/chlorination tank is in fluid communication with the outlet.

6. The biosolids concentrator and digester system of claim 5 further comprising:
    a first clarifier-first manifold connector;

a micron filter-first manifold connector;
a membrane filter-first manifold connector;
a first manifold;
a first manifold-sludge digester set connector;
a sludge digester set;
a sludge digester set-second clarifier connector;
a second clarifier; and,
a second clarifier-first clarifier connector;
wherein the first clarifier is in fluid communication with the first manifold through the first clarifier-first manifold connector;
wherein the micron filter is in fluid communication with the first manifold through the micron filter-first manifold connector;
wherein the membrane filter is in fluid communication with the first manifold through the membrane filter-first manifold connector;
wherein the first manifold is in fluid communication with the sludge digester set through the first manifold-sludge digester set connector;
wherein the sludge digester set is in fluid communication with the second clarifier through the sludge digester set-second clarifier connector; and,
wherein the second clarifier is in fluid communication with the first clarifier through the second clarifier-first clarifier connector.

7. The biosolids concentrator and digester system of claim 6 further comprising:
a second clarifier-mineral sludge tank connector; and,
a mineral sludge tank;
wherein the second clarifier is in fluid communication with the mineral sludge tank through the second clarifier-mineral sludge tank connector.

8. The biosolids concentrator and digester system of claim 7, wherein a component is thermally treated; and,
wherein the component is selected from the group consisting of the inlet, the digester, the first manifold, the first manifold-sludge digester set connector, the sludge digester set, and combinations thereof.

9. A method of concentrating and digesting biosolids comprising:
processing a waste stream through a biosolids concentrator and digester system,
wherein the biosolids concentrator and digester system comprises:
an inlet:
a digester;
a first clarifier;
a micron filter;
a membrane filter;
an outlet;
a pH adjustment/chlorination tank;
a first manifold;
a sludge digester set; and,
a second clarifier;
establishing fluid communications between the inlet and the digester;
establishing fluid communications between the digester and the first clarifier through a digester-first clarifier connector;
establishing fluid communication between the membrane filter and the pH adjustment/chlorination tank; and,
establishing fluid communication between the first manifold, the micron filter, the membrane filter, the sludge digester set, the second clarifier, and the first clarifier.

10. The method of concentrating and digesting biosolids of claim 9, wherein the biosolids concentrator and digester system further comprises:
a mineral sludge tank;
wherein the method of concentrating and digesting biosolids further comprises:
establishing fluid communication between the second clarifier and the mineral sludge tank.

11. The method of concentrating and digesting biosolids of claim 10 further comprising:
thermally treating a component; and,
wherein the component is selected from the group consisting of the digester, the first manifold, the sludge digester set, and combinations thereof.

12. The method of concentrating and digesting biosolids of claim 9 comprising:
establishing fluid communications between the first clarifier and the micron filter through a first clarifier-micron filter connector.

13. The method of concentrating and digesting biosolids of claim 9 comprising:
establishing fluid communications between the micron filter and the membrane filter through a micron filter-membrane filter connector.

14. The method of concentrating and digesting biosolids of claim 9 comprising:
establishing fluid communication between the membrane filter and the outlet.

* * * * *